United States Patent Office 2,893,856
Patented July 7, 1959

2,893,856
DEFOLIATING COMPOSITIONS

Philip C. Hamm, Webster Groves, Mo., assignor to Monsanto Chemical Company, St. Louis, Mo., a corporation of Delaware No Drawing. Application March 23, 1956
Serial No. 573,335

10 Claims. (Cl. 71—2.6)

This invention relates to a method of defoliating plants and to defoliating compositions.

Since the foliage often interferes with the proper functioning of mechanical harvesters, it is important to have efficient defoliating agents available. In accordance with this invention it has been discovered that certain thionocarbamates defoliate plants. The thionocarbamates effective for this purpose belong to the general class represented by the structure

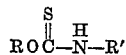

$$\text{RO}\overset{\text{S}}{\underset{\|}{\text{C}}}-\overset{\text{H}}{\underset{|}{\text{N}}}-\text{R}'$$

where R is an alkyl radical containing less than four carbon atoms and R' is an aryl radical, preferably a substituted aryl radical. Of this class of alkyl esters the effective defoliants comprise compounds in which R' is mononitrophenyl, mononitromonoalkylphenyl, mononitromonoalkoxyphenyl, mononitromonohalogenphenyl, 2,4-dihalophenyl, 2,5-dihalophenyl, 3,5-dihalophenyl, monohalophenyl, monoalkylphenyl, dialkylphenyl, monoalkoxyphenyl, dialkoxyphenyl, monohalomonoalkoxyphenyl and monohalomonoalkylphenyl radicals. Among esters of unsubstituted phenylthionocarbamic acid, the methyl ester is effective at higher dilutions than the ethyl ester. The activity falls as rapidly as the alkyl group increases above two carbon atoms. Compounds in which R is a 3,4-dihalogen substituted phenyl group are not defoliants and are excluded.

Typical specific thionocarbamates which may be employed for the purposes of this invention comprise N, -o, -m and -p-nitrophenyl O-ethylthionocarbamates, N, -o, -m and -p-chlorophenyl O-ethylthionocarbamates, N, -o, -m and -p-chlorophenyl O-isopropylthionocarbamates, N-(2-nitro-6-methylphenyl) O-ethylthionocarbamate, N-(2-nitro-3-methylphenyl) O-ethylthionocarbamate, N-(2-nitro-4-methylphenyl) O-ethylthionocarbamate, N-(3-nitro-4-methylphenyl) O-ethylthionocarbamate, N-(3-nitro-6-methylphenyl) O-ethylthionocarbamate, N-(4-nitro-2-methylphenyl) O-ethylthionocarbamate, N-(4-nitro-2-methoxyphenyl) O-ethyl-thionocarbamate, N-(3-nitro-4-fluorophenyl) O-ethylthionocarbamate, N-(2,4-dichlorophenyl) O-ethylthionocarbamate, N-(2,5-dichlorophenyl) O-ethylthionocarbamate, N-(3,5-dichlorophenyl) O-ethylthionocarbamate, N, -o, -m and -p-fluorophenyl O-ethylthionocarbamates, N, -o, -m and -p-bromophenyl O-ethylthionocarbamates, N, -o and -m and -p-iodophenyl O-ethylthionocarbamates, N-(3-methylphenyl) O-ethylthionocarbamate, N-(4-methylphenyl) O-ethylthionocarbamate, N-(2,3-dimethylphenyl) O-ethylthionocarbamate, N-(2,5-dimethylphenyl) O-ethylthionocarbamate, N-(3,5-dimethylphenyl) O-ethylthionocarbamate, N, -o, -m, and -p-methoxyphenyl O-ethylthionocarbamates, N-(2,5-dimethoxyphenyl) O-ethylthionocarbamate, N-(3,4-dimethoxyphenyl) O-ethylthionocarbamate, N-(3,5-dimethoxyphenyl) O-ethylthionocarbamate, N-(3-ethoxyphenyl) O-ethylthionocarbamate, N-(4-ethoxyphenyl) O-ethylthionocarbamate, N-(4-ethoxyphenyl) O-isopropylthionocarbamate, N-(4-chloro-3-methoxyphenyl) O-ethylthionocarbamate, N-(3-chloro-6-methoxyphenyl) O-ethylthionocarbamate, N-(3-chloro-5-methoxyphenyl) O-ethylthionocarbamate, N-(3-chloro-4-methoxyphenyl) O-ethylthionocarbamate, N-(3-chloro-5-methylphenyl) O-ethylthionocarbamate, N-(3-chloro-4-methylphenyl) O-ethylthionocarbamate, N-(3-chloro-2-methylphenyl) O-ethylthionocarbamate and N-(2-chloro-5-methylphenyl) O-ethylthionocarbamate.

These defoliants may be conveniently applied in the form of a spray containing concentrations of the active ingredient in the range of 0.1 to 10.0%, preferably 0.5 to 1.0%. Application to the foliage of such crop plants as cotton, beans and corn effects rapid deterioration of the foliage so that the leaves either dry up or drop off or both.

To prepare the defoliants in a form suitable for use the thionocarbamates may be dissolved in a solvent, as for example a mineral oil fraction, and the solution emulsified in water. Examples are light paraffin base oil, fuel oil, diesel oil and Bunker C fuel oil. Although the thionocarbamates are either insoluble or only slightly soluble in water, they are generally soluble in organic solvents. Materials having poor solubility in either medium may be applied as aqueous dispersions or as dusts. Hard or soft sodium or potassium soaps, alkylated aromatic sodium sulfonates, as for example, sodium dodecyl benzene sulfonate or amine salt of dodecyl benzene sulfonic acid, alkali metal salts of sulfated fatty alcohols, ethylene oxide condensation products of alkyl phenols or tall oil may be used as dispersing and wetting agents. These are merely illustrative as the wetting and dispersing agent selected is in nowise critical.

The defoliating activity of the compounds is illustrated by application to the foliage of various plants. In general the thionocarbamate was dissolved in an organic solvent and then emulsified in water and applied to the foliage at the concentration shown in the table below where the effect on the plants is also recorded. It will be noted that they exerted very efficient defoliating activity.

Table I

| Active Ingredient | Concentration, percent | Effect on Plant |
|---|---|---|
| Ethyl p-anisylthionocarbamate | 1.0 | 100% defoliation of beans. |
| Ethyl p-phenetylthionocarbamate | 1.0 | Do. |
| Ethyl p-tolylthionocarbamate | 1.0 | Do. |
| Methyl phenylthionocarbamate | 1.0 | Do. |
| Ethyl phenylthionocarbamate | 1.0 | 95% defoliation of beans. |

The formulation of dry defoliating compositions is readily accomplished by mixing a finely divided solid carrier with a minor proportion of the defoliant. Suitable carriers comprise talc, clay, pyrophyllite, silica and fuller's earth.

An important use of the compounds is for defoliating cotton. In hand picking time is lost hunting for balls hidden in the foliage. The machine picking the dry leaves contaminate the cotton and green leaves stain it. Defoliation is accomplished by development of an abscission layer which is very weak so the leaf is easily broken off.

It is intended to cover all changes and modifications of the examples of the invention herein chosen for purposes of disclosure which do not constitute departures from the spirit and scope of the invention.

What is claimed is:

1. The method of defoliation which comprises applying to foliage in concentration sufficient to effect defoliation, a member of the group consisting of ethyl p-anisylthionocarbamate, ethyl p-phenetylthionocarbamate, ethyl p-tolylthionocarbamate, methyl phenylthionocarbamate and ethyl phenylthionocarbamate.

2. The method of defoliation which comprises applying to foliage in concentration sufficient to effect defoliation, ethyl p-anisylthionocarbamate.

3. The method of defoliation which comprises applying to foliage in concentration sufficient to effect defoliation, ethyl p-phenetylthionocarbamate.

4. The method of defoliation which comprises applying to foliage in concentration sufficient to effect defoliation, ethyl p-tolylthionocarbamate.

5. The method of defoliation which comprises applying to foliage in concentration sufficient to effect defoliation, methyl phenylthionocarbamate.

6. A defoliant composition comprising a major proportion of a carrier and a minor proportion, sufficient to effect defoliation upon application to foliage, of a member of the group consisting of ethyl p-anisylthionocarbamate, ethyl p-phenetylthionocarbamate, ethyl p-tolylthionocarbamate, methyl phenylthionocarbamate and ethyl phenylthionocarbamate.

7. A defoliant composition comprising a major proportion of a carrier and a minor proportion, sufficient to effect defoliation upon application to foliage, of ethyl p-anisylthionocarbamate.

8. A defoliant composition comprising a major proportion of a carrier and a minor proportion, sufficient to effect defoliation upon application to foliage, of ethyl p-phenetylthionocarbamate.

9. A defoliant composition comprising a major proportion of a carrier and a minor proportion, sufficient to effect defoliation upon application to foliage, of ethyl p-tolylthionocarbamate.

10. A defoliant composition comprising a major proportion of a carrier and a minor proportion, sufficient to effect defoliation upon application to foliage, of methyl phenylthionocarbamate.

References Cited in the file of this patent

UNITED STATES PATENTS

| | | |
|---|---|---|
| 2,396,513 | Jones | Mar. 12, 1946 |
| 2,650,876 | Stewart | Sept. 1, 1953 |
| 2,776,196 | Gysin et al. | Jan. 1, 1957 |

OTHER REFERENCES

Templeman et al. in "Nature," vol. 156, November 24, 1945, page 630.